Figures 5, 6:
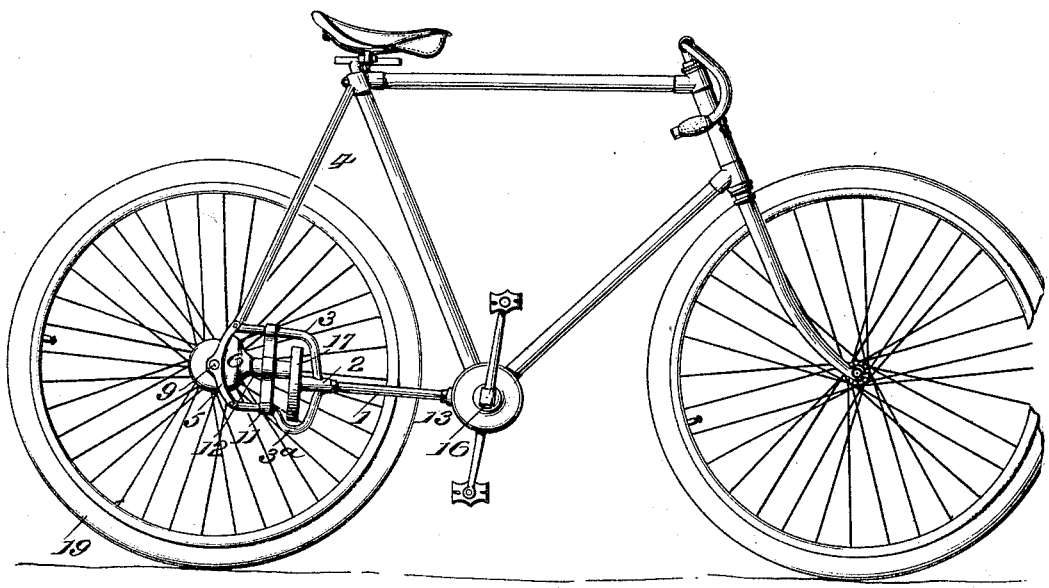

No. 697,675.  
A. M. SHAUCK.  
BICYCLE DRIVING GEAR.  
(Application filed Dec. 6, 1901.)

Patented Apr. 15, 1902.

(No Model.)

2 Sheets—Sheet 1.

No. 697,675. Patented Apr. 15, 1902.
A. M. SHAUCK.
BICYCLE DRIVING GEAR.
(Application filed Dec. 6, 1901.)

(No Model.) 2 Sheets—Sheet 2.

Witnesses

Inventor
Arthur M. Shauck.

By
Attorneys.

UNITED STATES PATENT OFFICE.

ARTHUR M. SHAUCK, OF GALION, OHIO.

BICYCLE DRIVING-GEAR.

SPECIFICATION forming part of Letters Patent No. 697,675, dated April 15, 1902.

Application filed December 6, 1901. Serial No. 84,961. (No model.)

*To all whom it may concern:*

Be it known that I, ARTHUR M. SHAUCK, a citizen of the United States, residing at Galion, in the county of Crawford and State of Ohio, have invented certain new and useful Improvements in Bicycle Driving-Gear; and I do hereby declare the following to be a full, clear, and exact description of the invention, such as will enable others skilled in the art to which it appertains to make and use the same.

This invention relates to driving-gear for bicycles and like machines, dispensing with the usual drive-chain between the crank-axle and the drive-wheel, the purpose being to increase the speed without proportionately increasing the power exerted for propelling the machine.

The invention consists, essentially, of the drive-shaft composed of sections and having the parts out of line and connected by a speed-gearing and the peculiar construction of frame forming a bearing for the proximal ends of the drive-shaft sections.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a plan view of the lower rear portion of a bicycle, showing the application of the invention. Fig. 2 is a view similar to Fig. 1 in section and showing the parts on a larger scale. Fig. 3 is a detail perspective view. Fig. 4 is a detail perspective view of the rear section and adjacent end portion of the drive-shaft members, showing the relation of the gearing. Fig. 5 is a side view of a bicycle embodying the invention. Fig. 6 is a plan section of the lower run, showing the drive-shaft and gearing connecting it with the crank-axle and drive-wheel.

Corresponding and like parts are referred to in the following description and indicated in all the views of the drawings by the same reference characters.

The bicycle-frame and coöperating parts may be of any type or pattern, with the exception of the part forming a bearing for the rear section and rear end portion of the drive-shaft members.

The lower side run 1 is provided at its rear end with a coupling 2, from which upper and lower fork members 3 and 3ª extend. One of the rear fork members 4 is joined to or forms a part of the fork member 3, and a yoke 5 connects the rear end of the fork members 3 and 3ª and is provided with a housing 6 for inclosing the bevel gear-wheel 7 at the rear end of the drive-shaft section 8. The axle 9 of the drive-wheel is mounted at one end in the yoke 5, and the contiguous end of the head is provided with a bevel gear-wheel 10, in mesh with the bevel gear-wheel 7. The fork members 3 and 3ª are further connected by means of a yoke 11, formed of a strip of metal folded upon itself, so as to embrace the parts 3 and 3ª, and having the middle portion of the folded parts oppositely deflected to receive a tube 12, through which the shaft-section 8 passes. The fork members 3 and 3ª are offset intermediate of their ends, as shown most clearly in Fig. 1, to accommodate the parts 1 and 12, which are out of line.

The front section 13 of the drive-shaft is provided at its forward end with a bevel-pinion 14, which is in mesh with a bevel-gear 15, secured to the crank-axle 16, so as to receive motion therefrom. This section 13 passes through the tubular run 1 and is provided at its rear end with a gear-wheel 17 of the internal-tooth type and having its cogs in meshing relation with the cogs of a gear-wheel 18, secured to the front end of the shaft-section 8. The gear-wheel 17 is of larger diameter than the gear-wheel 18 and forms a housing therefor. The gear elements 17 and 18 are of different diameter and have an eccentric arrangement, and as a result of this construction the speed of the shaft-section 8 is augmented, with the result that the drive-wheel 19 revolves faster than the shaft-section 13, even though the bevel-gears 7 and 10 are of like diameter. A further advantage of this construction is the near relation of the drive-shaft to the plane of the drive-wheel, and this would not be the case if the bevel-gear 7 were of larger diameter than the bevel-gear 10. The side runs therefore have a minimum transverse space between them at corresponding points, which is of material advantage.

Having thus described the invention, what is claimed as new is—

1. In a bicycle or like machine, and in combination with the drive-wheel and crank-axle, a drive-shaft for transmitting motion from the crank-axle to the drive-shaft, the same composed of sections arranged out of line, and speed-gearing connecting the proximal ends of the drive-shaft sections, substantially as set forth.

2. In a bicycle or like machine, the frame having a lower side run composed of tubular sections arranged out of line, rigid connection between the proximal ends of the said sections, the drive-wheel and crank-axle, a drive-shaft between the drive-wheel and crank-axle composed of parts passing through the respective sections of the aforementioned side run, and speed-gearing connecting the proximal ends of the drive-shaft sections, substantially as set forth.

3. In a bicycle or like machine, the frame having its lower side run composed of tubular sections arranged out of line, a fork rigidly attached to the rear end of a section and having the rear end of its upper member connected with the lower end of the proximal rear fork member, yokes connecting the upper and lower fork members at their rear ends and intermediate of their ends, the intermediate yoke forming a brace for the rear portion of the aforementioned side run, the drive-wheel and crank-axle, a sectional drive-shaft between the drive-wheel and crank-axle and having its parts located within the sections of the aforesaid run, and speed-gearing connecting the proximal ends of the drive-shaft sections, substantially as specified.

In testimony whereof I affix my signature in presence of two witnesses.

ARTHUR M. SHAUCK. [L. S.]

Witnesses:
G. J. KOCHENDERFER,
G. W. MACKEY.